(12) United States Patent
Friskney et al.

(10) Patent No.: US 8,854,975 B2
(45) Date of Patent: *Oct. 7, 2014

(54) SCALING OAM FOR POINT-TO-POINT TRUNKING

(71) Applicant: Rockstar Consortium US LP, New York, NY (US)

(72) Inventors: Robert Friskney, Harlow (GB); Simon Parry, Bishops Stortford (GB); David Allan, Ottawa (CA)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,472

(22) Filed: Nov. 14, 2012

(65) Prior Publication Data

US 2013/0070586 A1     Mar. 21, 2013

Related U.S. Application Data

(63) Continuation of application No. 11/845,930, filed on Aug. 28, 2007, now Pat. No. 8,325,611.

(51) Int. Cl.
*G01R 31/08* (2006.01)
*H04L 12/24* (2006.01)

(52) U.S. Cl.
CPC ........ *H04L 12/2419* (2013.01); *H04L 41/0681* (2013.01); *H04L 41/0806* (2013.01)

USPC ....................................................... 370/236.2

(58) Field of Classification Search
None
See application file for complete search history.

(56) References Cited

U.S. PATENT DOCUMENTS

| | | | | |
|---|---|---|---|---|
| 5,321,688 | A | * | 6/1994 | Nakano et al. ................. 370/244 |
| 8,325,611 | B2 | * | 12/2012 | Friskney et al. ........... 370/236.2 |
| 2009/0034413 | A1 | * | 2/2009 | Sajassi et al. ................. 370/228 |

* cited by examiner

*Primary Examiner* — Kwang B Yao
*Assistant Examiner* — Tung Q Tran
(74) *Attorney, Agent, or Firm* — Anderson Gorecki & Rouille LLP

(57) ABSTRACT

A shared (proxy) OAM session is performed in a packet-based network on behalf of a plurality of connections. First and second connections are each routed between respective nodes of the network for carrying data traffic. The second connection shares a portion of the routing of the first connection. The shared OAM session is performed along a path which is co-routed with at least part of the shared portion of the routing of the first connection and the second connection. Failure notification signalling is propagated to an endpoint node of each of the first and second connections when the shared OAM session indicates a failure has occurred. The use of a shared OAM session reduces processing at nodes and reduces OAM traffic. Each connection can be a trunk, such as a PBT/PBB-TE trunk, or a service carried within a trunk.

18 Claims, 11 Drawing Sheets

US 8,854,975 B2

SCALING OAM FOR POINT-TO-POINT TRUNKING

This application is a continuation of U.S. patent application Ser. No. 11/845,930, filed Aug. 28, 2007, the content of which is hereby incorporated herein by reference.

FIELD OF THE INVENTION

This invention relates to performing Operations, Administration and Management (OAM) sessions, such as Continuity Checks, in a network.

BACKGROUND TO THE INVENTION

For many years now, telecommunications carriers have been deploying packet-switched networks in place of, or overlaid upon, circuit-switched networks for reasons of efficiency and economy. Packet-switched networks such as Internet Protocol (IP) or Ethernet networks are intrinsically connectionless in nature and, as a result, suffer from Quality of Service (QoS) problems. Customers value services which are guaranteed in terms of bandwidth and QoS.

One proposal has been to use Ethernet switches in carriers' networks. Use of Ethernet switches in carriers' networks has the advantages of interoperability (mappings between Ethernet and other frame/packet/cell data structures such as IP, Frame Relay and ATM are well known) and economy (Ethernet switches are relatively inexpensive compared to IP routers, for example). Nortel has proposed a form of 'Connection-oriented Ethernet' (CoE) known as Provider Backbone Transport (PBT), which is described in WO 2005/099183 and in the paper "Ethernet as Carrier Transport Infrastructure", David Allan, Nigel Bragg, Alan McGuire, Andy Reid, IEEE Communications Magazine February 2006. PBT is being standardised by the WEE under the descriptor Provider Backbone Bridging-Traffic Engineering (PBB-TE).

In a conventional Ethernet network switches decide for themselves how to forward packets by processes known as 'flooding' and 'learning'. In a Provider Backbone Transport (PBT) network, these processes are disabled and, instead, managed traffic paths are set up across the network of Ethernet switches. A network manager in the control plane instructs each Ethernet switch along a path to store forwarding instructions. The switch uses the forwarding instructions to forward received data frames. The forwarding instructions operate on a particular combination of identifiers in a data frame, such as a Virtual Local Area Network Identifier (VLAN ID or VID) and the destination MAC address (DA). As traffic is now constrained to follow pre-determined paths through the network, this allows network operators to perform traffic engineering on the Ethernet network, such as planning working and protection paths having diverse routes through the network and provisioning additional trunks to increase capacity.

It is intended that PBT should have a similar range of Operations, Administration and Management (OAM) capabilities as other carrier technologies. One form of OAM is Connectivity Fault Management and this is being standardised in IEEE 802.1ag. IEEE 802.1ag defines that a Continuity Check (CC) message is sent between two endpoints of a trunk at regular intervals, such as every 10 ms. If one end point fails to receive a CC message within a particular time period (e.g. 3.5 times the interval at which CC signals are usually sent) the trunk is declared down, and an Alarm Indication Signal (AIS) may be raised. The failure to receive a CC message can be due to a cable or optical fibre being accidentally severed. In response to the failure condition, a node can switch traffic to a protection path. Typically, a carrier requires this process of switching traffic to a protection path to take place within a period of 50 ms from the fault occurring.

While each CC message, by itself, is a short message requiring a small amount of processing at a node, the accumulated amount of processing required to process regular CC messages on every trunk can present a significant processing burden on a node. Switches can be provisioned with an amount of processing power matched to the demands of the expected CC sessions, but the amount of processing is limited by factors such as cost, space and power consumption/thermal emission of the processors. This can limit the number of CC sessions that can be supported, which in turn limits the number of trunks and the overall size of the network which can be supported. A further disadvantage is that fast CC sessions consume bandwidth. If there is a very large number of fast CC sessions, they will consume a lot of bandwidth, particularly over core links where the CC sessions are likely to be most dense and the bandwidth most expensive. If PBT is applied to national-scale networks and used for point-to-point business services, it is likely that there will be a large number of trunks carrying very few service(s) per trunk.

A similar problem can arise in non-Ethernet networks such as MultiProtocol Label Switching (MPLS) networks.

The present invention seeks to reduce the processing load on network devices to implement OAM sessions, such as Continuity Checks (CC), and/or to reduce the amount of bandwidth occupied by OAM session messaging, such as CC messages.

SUMMARY OF THE INVENTION

One aspect of the present invention provides a method of performing OAM sessions in a packet-based network. A first connection is routed between nodes of the network for carrying data traffic and a second connection is routed between nodes of the network for carrying data traffic. The second connection shares a portion of the routing of the first connection. A shared OAM session is performed along a path which is co-routed with at least part of the shared portion of the routing of the first connection and the second connection. Failure notification signalling is propagated to an endpoint node of each of the first and second connections when the shared OAM session indicates a failure has occurred.

The second connection can share the same routing as the first connection over the full length of the first connection, or over a part of the length of the first connection. The shared part of the routing can exist at one end of a connection (e.g. a part of a network where multiple connections converge along the same routing towards a destination node) or at any other part of the connection. It is not necessary that the endpoints of the shared portion of the routing, or the endpoints of the shared OAM session, are nodes where traffic is terminated. Indeed the endpoints of the shared OAM session can be chosen as points which are convenient for the purposes of the OAM based, for example, on topology of the network or convenience, rather than being dictated by data forwarding layers of the network or individual links between items of equipment within a network. The shared OAM session is shared by both the first and second connections. This has an advantage of avoiding the need to perform separate OAM sessions for each of the connections over the shared part of the routing, which results in reduced OAM session processing at some of the nodes and a reduced number of OAM session messages, especially where the OAM session requires a frequent exchange of signalling. The reduced number of OAM session messages frees bandwidth for other traffic. This is particularly useful as often lower-level failures can cause a very large number of simultaneous higher-level failures, resulting in potentially much-increased protection times. Although the claims recite a first connection and a second connection, it will be apparent that the concept can be extended to any larger number of connections which share some, or all, of their routing.

The shared OAM session may be performed along all, or only a part, of the shared portion of the routing. It is desirable that the end-to-end path of each connection is covered by a mechanism which provides fast failure notification signalling. Other OAM sessions can be performed along parts of the connections which are not covered by the shared OAM session. These may be shared OAM sessions which are shared with other connections, per-connection OAM sessions, or some different OAM mechanism.

Each connection can be a trunk, such as a PBT trunk, or a service carried within a trunk. In the case of PBT, a trunk is differentiated from other trunks by a combination of VLAN ID (VID) and destination MAC address carried within the header. Services within a PBT trunk are identified by a Service ID (I-SID).

The OAM session can be a Continuity Check, such as described in IEEE 802.1ag or any other kind of probe signalling which shares the routing of the data traffic, such as ITU Y.1731, ITU Y.1711 and equivalents for other transports such as MPLS.

A failure of the continuity check can be used to trigger protection switching at one of the endpoint nodes of a connection.

Conveniently, an endpoint of the shared OAM session can be a node which a plurality of connections are routed through (called a 'pinning point' in the following description.) However, there is no requirement that shared OAM sessions must terminate at every intermediate pinning point along a forwarding path. Also, the choice of endpoint for the shared OAM session can be made differently for multiple connections sharing the same route.

Advantageously, an end-to-end OAM session is established between endpoints of each connection. This can serve as a context in which to receive failure-notification messages. Additionally, or alternatively, the end-to-end OAM session can be used to exchange OAM signalling (such as a Continuity Check signalling) at a slower rate to that exchanged over the shared OAM session. This will be called a 'slow CC session' in contrast to a 'fast CC session' in the following description.

The present invention is applicable to Provider Backbone Trunking (PBT)/Provider Backbone Bridging-Traffic Engineering (PBB-TE) networks, MultiProtocol Label Switching (MPLS) networks, and other types of network where OAM functionality is required.

Another aspect of the present invention provides a method of operating a first node in a packet-based network in which a first connection is routed between nodes of the network for carrying data traffic and a second connection is routed between nodes of the network for carrying data traffic, the second connection sharing a portion of the routing of the first connection, the first and second connections being routed via the first node, the method comprising:

performing a shared OAM session between the first node and another network node, the OAM session being along a path which is co-routed with at least part of the shared portion of the routing of the first connection and the second connection; and sending fault notification signalling from the first node to an endpoint node of each of the first and second connections when the shared OAM session indicates a fault has occurred.

A further aspect of the present invention provides a first node for use in a packet-based network in which a first connection can be routed between nodes of the network for carrying data traffic and a second connection can be routed between nodes of the network for carrying data traffic, the second connection sharing a portion of the routing of the first connection, the first and second connections being routed via the first node, the first node comprising a processor arranged to:

perform a shared OAM session between the first node and another network node, the OAM session being along a path which is co-routed with at least part of the shared portion of the routing of the first connection and the second connection; and send fault notification signalling from the first node to an endpoint node of each of the first and second connections when the shared OAM session indicates a fault has occurred.

A further aspect of the present invention provides a method of configuring an OAM session in a packet-based network in which a first connection is routed between nodes of the network for carrying data traffic and a second connection is routed between nodes of the network for carrying data traffic, the second connection sharing a portion of the routing of the first connection, the method comprising:

configuring a shared OAM session between a first node and a second node of the network along a path which is co-routed with at least part of the shared portion of the routing of the first connection and the second connection; and configuring the first node and the second node to propagate fault notification signalling to an endpoint node of each of the first and second connections when the shared OAM session indicates a fault has occurred.

A further aspect of the present invention provides a network management entity for configuring OAM sessions in a packet-based network in which a first connection is routed between nodes of the network for carrying data traffic and a second connection is routed between nodes of the network for carrying data traffic, the second connection sharing a portion of the routing of the first connection, the network management entity being arranged to:

configure a shared OAM session between a first node and a second node of the network along a path which is co-routed with at least part of the shared portion of the routing of the first connection and the second connection; and configure the first node and the second node to propagate fault notification signalling to an endpoint node of each of the first and second connections when the shared OAM session indicates a fault has occurred.

The functionality described here can be implemented in software, hardware or a combination of these. The invention can be implemented by means of hardware comprising several distinct elements, and by means of a suitably programmed computer. Accordingly, another aspect of the invention provides software for implementing any of the described methods.

It will be appreciated that software may be installed on the nodes, or network management entity, at any point during the life of the equipment. The software may be stored on an electronic memory device, hard disk, optical disk or any other machine-readable storage medium. The software may be delivered as a computer program product on a machine-readable carrier or it may be downloaded to a node via a network connection.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
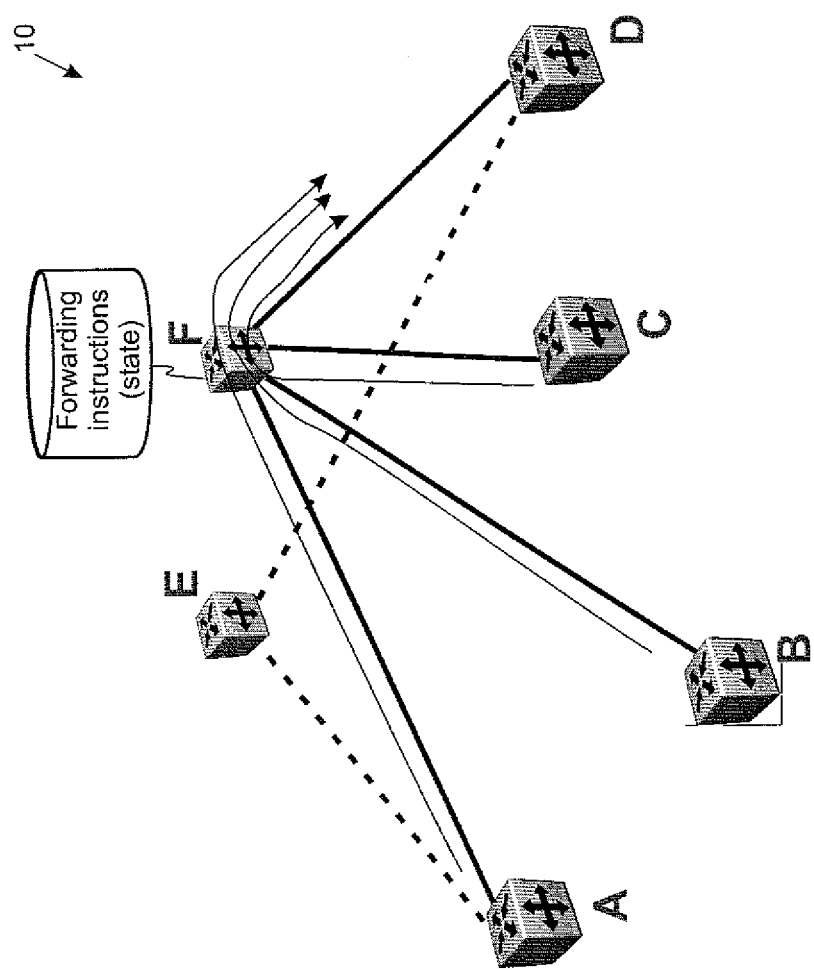
FIG. 1 shows a first example of a network in which the invention can be implemented.

FIG. 1 shows a simple network 10 having nodes A-F. Communication links join nodes A-F, B-F, C-F and D-F. FIG. 1 shows the point-to-point trunks that are required to connect any of the end points A-C with node D via node F. A total of three trunks are required: a first trunk is routed between nodes A and D via intermediate node F; a second trunk is routed between nodes B and D via intermediate node F and a third trunk is routed between nodes C and D via intermediate node F. To connect any other of the nodes A-C in the network with one another, three further trunks are required: a trunk routed between nodes A and B via node F; a trunk routed between nodes A and C via node F and a trunk routed between nodes B and C via F. These additional trunks are not shown, for clarity. Backup routes can be provisioned between a pair of nodes via node E, and only one such route (node A to node D via node E) is shown, for clarity. A switch at node F stores state in the form of forwarding instructions which allows the switch to correctly route traffic. The network 10 can take the form of a Provider Backbone Transport (PBT) network, based on Ethernet switches. In a PBT network, the forwarding instructions at node F specify a destination port of the switch to which data frames should be forwarded, based on a combination of VLAN ID (VID) and destination MAC address (DA). The switch inspects the VLAN ID and DA fields of the header of each data frame arriving at an ingress port of the switch and forwards the data frame to an egress port based on the forwarding instructions. As described above, disabling the normal "flooding" and "learning" processes of the Ethernet switches, and using a control plane to send forwarding instructions to each of the switches, allows Ethernet switches to be used in this way.

Figure 2:
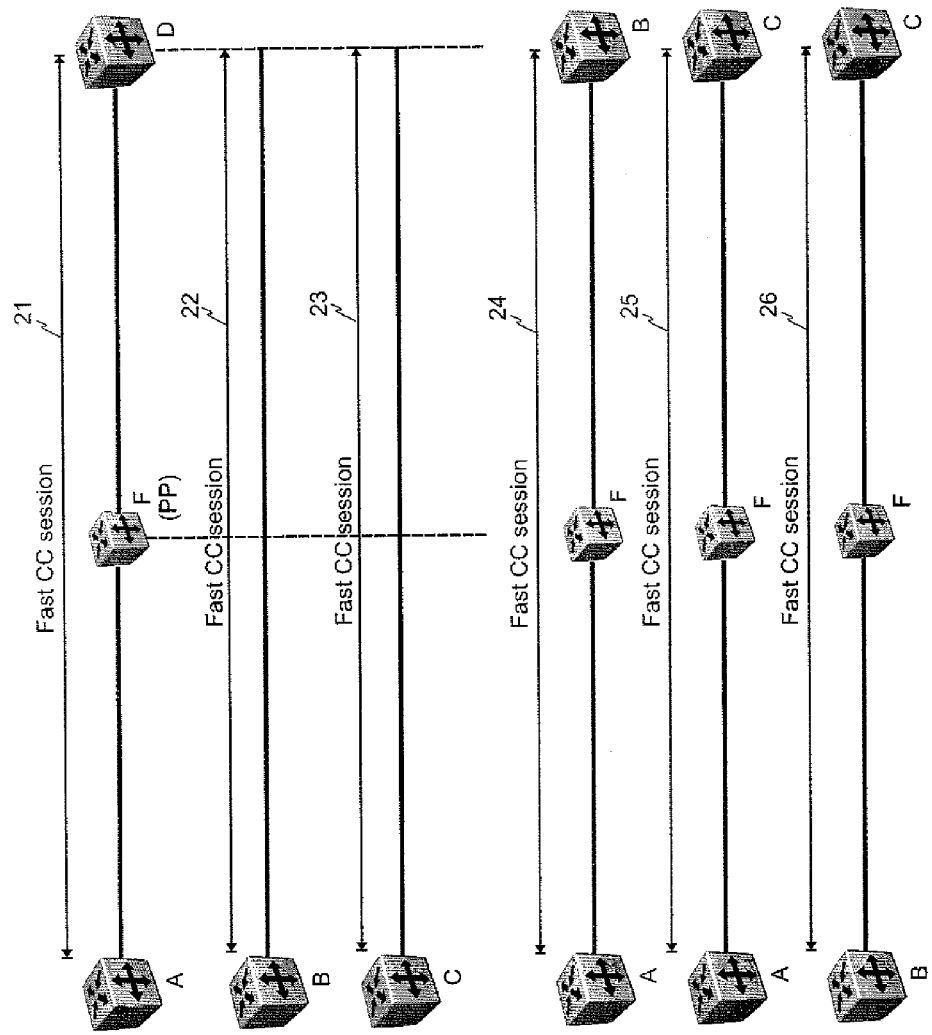
FIG. 2 shows a set of fast Continuity Check sessions between the endpoints of trunks routed across the network of FIG. 1.

One OAM operation which can be performed over each of the trunks is an end-to-end Continuity Check, such as that described in IEEE 802.1ag. FIG. 2 shows a first way in which this can be achieved. A fast CC session is performed between the endpoint nodes of a trunk, for every trunk in the network. The messages forming the fast CC session are co-routed with the traffic, i.e. the fast CC messages between a given pair of endpoints follow the same route as packets carrying traffic between that pair of endpoints. A first fast CC session 21 is performed between nodes A and D via node F, a second fast CC session 22 is performed between nodes B and D via node F, and a third fast CC session 23 is performed between nodes C and D via node F. Considering other trunks within the network of FIG. 1, three further fast CC sessions are needed: a fast CC session 24 between nodes A and B via node F; a fast CC session 25 between nodes A and C via node F; and a fast CC session 26 between nodes B and C via node F. This requires a total of six end-to-end fast CC sessions. In addition, if trunks terminate on node F, four additional fast CC sessions are needed between nodes A-F, B-F, C-F and D-F. In PBT, each CC message has the same outermost header (source/destination MAC address, VID) as user traffic and so node F does not need to distinguish between user traffic and CC messages.

It can be seen that there is a large amount of redundancy in the fast CC monitoring. Just considering trunks connecting with node D, all three trunks share the path F-D, and the three continuity checks 21, 22, 23 will all monitor the same path between nodes F and D as part of their overall routing between endpoint nodes.

Figure 3:
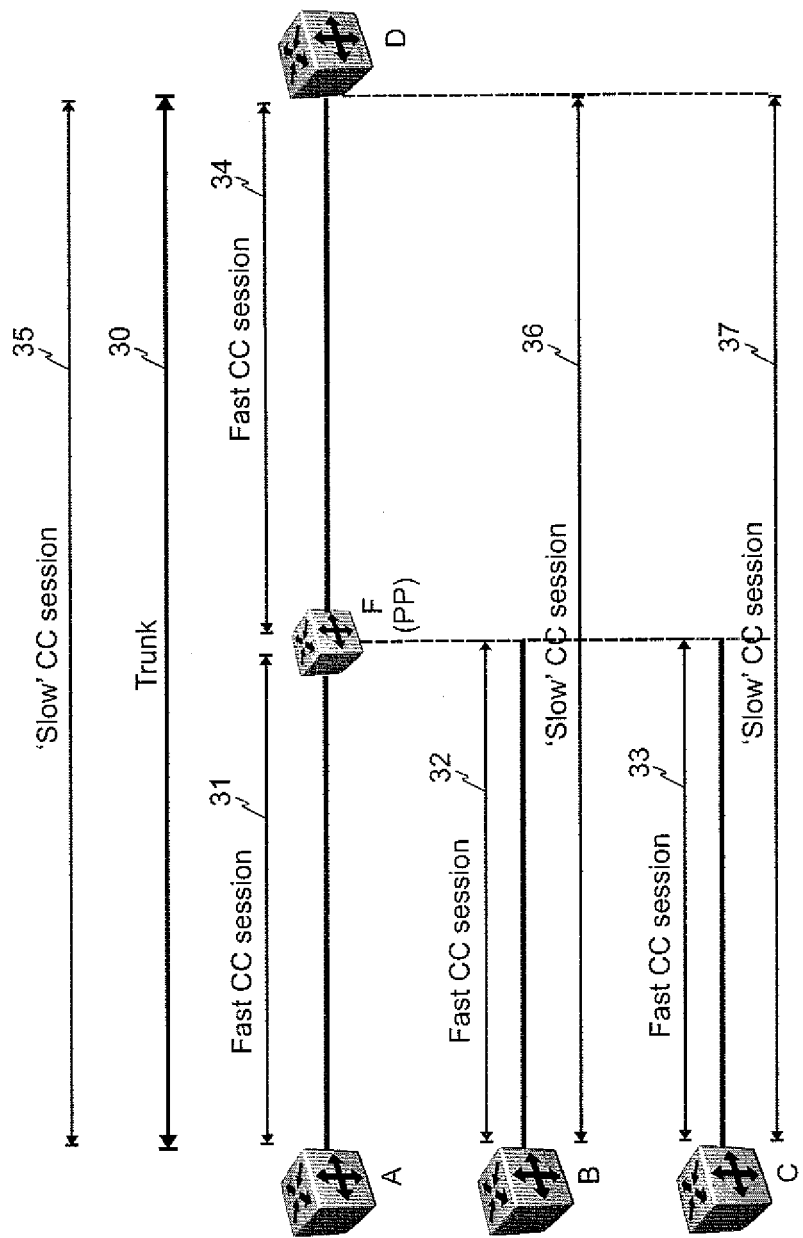
FIG. 3 shows a reduced set of fast Continuity Check sessions for monitoring the continuity of trunks routed across the network of FIG. 1 in accordance with an embodiment of the present invention.

FIG. 3 shows an alternative way in which the continuity check sessions can be performed, in accordance with an embodiment of the present invention. A first fast CC session 31 is performed between nodes A and F, a second fast CC session 32 is performed between nodes B and F, and a third fast CC session 33 is performed between nodes C and F. A further fast CC session is performed between nodes F and D. It can be seen that each of the fast CC sessions 31, 32, 33 terminate on intermediate node F, and do not connect the endpoints of the trunks. Similarly, fast CC session 34 terminates on intermediate node F. As only a single fast CC session 34 occurs over the path F-D, less of the bandwidth of link F-D is occupied by CC messages, and node D only needs to process the single fast CC session 34, rather than the three fast CC sessions 21, 22, 23. Fast CC session 34 acts as a proxy fast CC session on behalf of any trunks which make use of the path F-D. Similarly, if end-to-end fast CC sessions were performed on all trunks connecting with node C, there would be three fast CC sessions (A-F-C, B-F-C, D-F-C) which monitor the path F-C. As the fast CC session 33 monitors the path F-C, there is no need for additional fast CC sessions supporting trunks terminating on node C and so there is a similar saving in processing at node C. Fast CC session 33 acts as a proxy fast CC session on behalf of any trunks which make use of the path F-C. In a similar manner, savings are also made at nodes A and B. In fact, the four fast CC sessions 31-34 shown in FIG. 3 are sufficient for any trunks between nodes A-D routed via F. In general, the number of fast CC sessions has been found to scale as a function of the number of nodes in the network, rather than as a higher factor (e.g. the square) of the number of nodes in the network. Similarly, the amount of fast CC session traffic and the amount of fast CC session processing scales as a function of the number of nodes in the network.

In this embodiment intermediate node F will be called a pinning point (PP) as trunks between nodes are routed (pinned) via this node. It has been found advantageous to select a subset of the nodes in the network as pinning points based on their connectivity with other nodes (e.g. a node which is connected to at least N other nodes) or their position within the network (e.g. a node on the boundary between networks). By constraining the routing of trunks between nodes to be made via at least one pinning point, the routing of multiple trunks will share certain links of the network. It has been found that routing in this way reduces the number of forwarding table entries required at an intermediate node, especially when the forwarding is based on the destination address of traffic. This can also reduce the number of fast CC sessions, since a single fast CC session (or more generally, OAM session) only needs to be performed over the shared link or links. The concept of planning connections using pinning points (waypoint nodes) is described more fully in US2007/0177527 and WO2007/088341, the contents of which are incorporated herein by reference.

In FIG. 3 there is an end-to-end CC session (e.g. 802.1ag session) for each trunk. So, there is a first CC session between the endpoints A, D of trunk A-D, a second CC session between the endpoints B, D of trunk B-D, and a third CC session between the endpoints C, D of trunk C-D. The end-to-end CC session provides a context in which a node can receive an AIS frame, when a fault is detected. However, it is not essential that the end-to-end CC session carries any CC messages as the fast CC sessions 31, 34 should detect any continuity faults. If the end-to-end CC session does carry a regular flow of CC messages, the flow can occur at a much slower rate (e.g. once every second) than that used for 'fast' detection of continuity failure. This serves as a back-up in case, for example, of some mis-configuration of the association with the fast CC session. As the interval between messages is much longer than the fast CC sessions 31, 34, the additional processing requirements are manageable and the bandwidth occupied by the messages is insignificant.

When a fast CC session (or proxy fast CC session) indicates that a fault is present, traffic can be transferred to a protection path. Referring again to FIG. 1, the trunk between A and D has a working path which is routed A-F-D and a protection path which is routed A-E-D.

Figure 4:
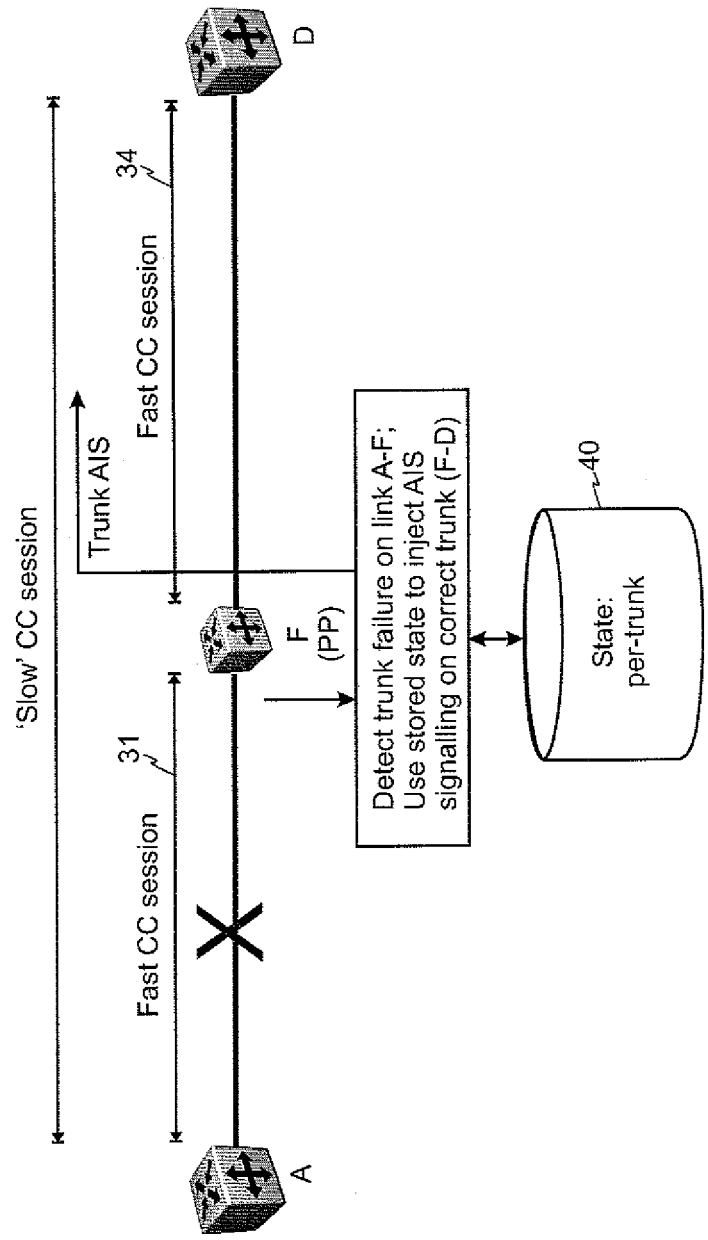
FIG. 4 shows a first way of signalling failure on one of the legs of the network of FIG. 1 which uses per-trunk state.

In FIG. 3 it can be seen that a fast CC session which would have been performed between two endpoint nodes of a trunk (e.g. nodes A and D) has been broken into two separate fast CC sessions 31 and 34. The endpoints of a trunk no longer 'talk' directly to one another. Taking the example of a fault occurring between nodes A and F, node D will not know when that fault occurs. Similarly, when a fault occurs between nodes F and D, nodes A, B and C will not know when that fault occurs. FIGS. 4-7 illustrate a variety of ways in which a node can determine that a failure has occurred on the far side of an intermediate node (pinning point). In summary these are:
  intermediate node injects trunk AIS;
  the end of a trunk local to the failure signals a protection switch via another protocol (e.g. g.8031);
  intermediate node signals 'link to node x down' to all nodes
  intermediate node signals 'link to node x down' to interested parties only.
Option 1—Inject Trunk AIS
FIG. 4 illustrates the first way in which the intermediate node F can operate. The intermediate node F stores per-trunk state. As will be more fully explained below, the per-trunk state is data which identifies two connections terminating on the ports of a node as being two legs of a particular trunk. With this data, the node can determine which nodes or trunks need to be informed when one of the fast CC sessions indicates a fault on a particular path. In the present example, node F will know that there are trunks A-F-D, B-F-D and C-F-D. When the proxy fast CC session 34 indicates a fault on path F-D, node F inspects the stored state and determines that path F-D is used by trunks terminating on nodes A, B and C. Node F sends an Alarm Indication Signal (AIS) on each of those trunks. An AIS is injected into the slow CC session associated with each of the individual trunks A-F-D, B-F-D and C-F-D which are affected by the fault on path F-D. This alerts nodes A, B and C of the fault. Other trunks which pass through node F, but which are unaffected by the fault on path F-D, will not be alerted of the fault.

Advantageously, the proxy fast CC session 34 operates very fast without too much burden, e.g. at a 10 ms or even a 3.33 ms CC interval. This would result in detection times of 35 ms or 11.6 ms (approx) respectively at node F. Node F can then generate AISes. When AISes arrive they instantly trigger protection switching with no timeout. Thus, if message processing time is negligible, protection switching time is equivalent to having the fast CC session end-to-end (detection is at node F rather than e.g. node C, but then there is only the additional propagation delay F-C which the detection would otherwise additionally have had to suffer). Similarly, when a fault occurs on the path A-F (as shown in FIG. 4), fast CC session 31 between nodes A and F will cause the fault to be detected by nodes A and F. Node F inspects the stored state and determines that path A-F is used by a trunk terminating on node D. Node F sends an Alarm Indication Signal (AIS) on that trunk by injecting an AIS into the slow CC session associated with trunk A-F-D. This alerts node D of the fault.

The stored state provides the intermediate node F with the knowledge of which fast CC session is associated with which other node. The closest way of doing this to the 802.1ag standards is to introduce the edge-intermediate node link as an entity in the existing 802.1ag hierarchy, and to make the intermediate node F aware of all of the trunks that pass through it (specifically, the trunk OAM sessions associated and its two ports on that intermediate node). Then it is legitimate to immediately emit an AIS message at the trunk layer as a result of a CC failure on the edge-intermediate node link.

An explanation of per-trunk state follows. When a trunk is provisioned, intermediate nodes along the route of that trunk are each provisioned with two distinct forwarding-table entries. The trunk may not know that the two entries are associated, but they are the two directions of the trunk:
  DA1, VID x, <output port towards DA1>
  DA2, VID y, <output port towards DA2>
where x and y are independent, and may or may not be equal.

If an intermediate node needs to know about the trunks passing through it, then it is configured with the following information:
<Trunk Name>
  West: DA1, VLAN x, <output port towards DA1>
  East: DA2, VLAN y, <output port towards DA2>
where 'West' and 'East' are arbitrary identifiers of the two directions of the trunk and have no meaning away from the intermediate node. It should be noted that the forwarding table entries are the same as before, but:
  the two legs of the trunk now grouped together;
  with the forwarding table entries retained for this particular trunk such that when this trunk is deleted the right forwarding table entries are deleted. Forwarding table entries can still be shared, although they would need to be reference-counted to ensure they were only deleted when the last trunk that used them was deleted.
  with an over-riding OAM identifier. [Which might be an identifier to be used in east-west OAM traffic e.g. 802.1ag, or might just be an arbitrary identifier used via a northbound interface.]

Consider the legs of trunk A-F-C in FIG. 1 at intermediate node F:

Node A is connected to node F's port 3. Node A's MAC address is 'A'.

Node C is connected to node F's port 7. Node C's MAC address is 'C'.

If node F did not keep trunk state then its forwarding tables would be provisioned with (if they did not already contain):
DA=A, VID=6, port 3.
DA=C, VID=7, port 7.

Or if node F did keep per-trunk state it could be provisioned with the record:
"Trunk 6"
DA=A, VID=6, port 3.
DA=C, VID=7, port 7.

A Further Example of Per-Trunk State Stored at Intermediate Node F:

| Trunk | E DA | E V | E F | E P | W DA | W V | W F | W P |
|---|---|---|---|---|---|---|---|---|
| AD | <> | 4 | AF | 2/1 | <> | 5 | FD | 3/1 |
| AC | <> | 4 | AF | 2/1 | <> | 7 | FC | 3/2 | where:
E DA = eastbound destination MAC address
E V = eastbound VID
E F = eastbound Fast OAM session ID
E P = eastbound Port
W DA = westbound destination MAC address
W V = westbound VID
W F = westbound Fast OAM session ID
W P = westbound Port It can be seen that this table defines:
- a trunk within the network (e.g. AD is the trunk connecting nodes A and D)
- the legs of the trunk which terminate on that intermediate node (in terms of Destination MAC address, VID, port number)
- an identifier of the fast OAM session which should be associated with each leg of the trunk.

When new information about a trunk is received, the table is checked. If an entry for that trunk already exists in the forwarding table then the table is not modified. If an entry in the table exists with a matching DA & VLAN but conflicting output port then the control plane has made a mistake—it should have allocated a different VLAN for the new trunk. Otherwise, the new information is added to the table.

Figure 8:
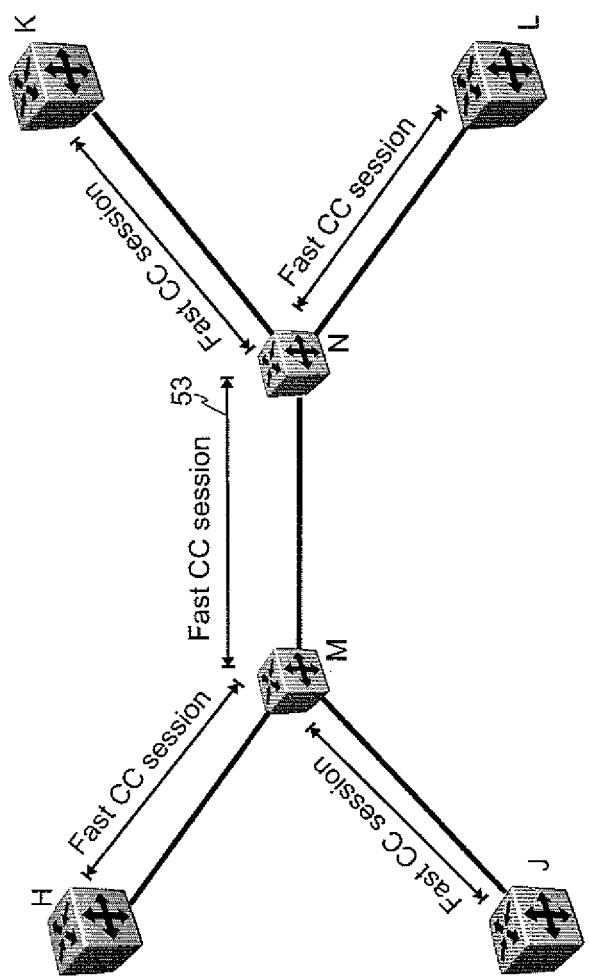
FIG. 8 shows a network with multiple pinning points.

FIG. 1 showed a simple network topology in which the intermediate node F directly connects to both the source and destination nodes. FIG. 8 shows a more complex network topology. The shared path is a segment within the network. A first trunk is routed H-M-N-K and a second trunk is routed J-M-N-L. Node M has fast CC sessions with nodes H, J and N. Node N has fast CC sessions with nodes K, L and M. State stored at node M, for use in data forwarding, will include the ultimate destination address of data frames (node K or node L). The state stored at node M also defines an association between trunks and proxy OAM sessions. Therefore, when the trunk HMNK is configured, node M is configured with an association to proxy sessions H-M and M-N. If H-M and M-N were real data-path entries—as opposed to virtualized OAM-only entries—then this information would already be stored for data-forwarding purposes.

This embodiment has the advantages that it is closest to the intent of IEEE 802.1ag layering and also supports the possibility of more than one pinning point in a path. A disadvantage of this embodiment is that per-trunk state is required, although a GMPLS/ASON type configuration with box-local control plane would require this information anyway. The fast/proxy CC sessions can be provisioned at the same time as trunks are provisioned. Alternatively, the fast/proxy CC sessions can be provisioned as a lower-level infrastructure operation, such as part of a route planning activity which occurs before trunks are provisioned.

Option 2—Rely on g.ethps

Figure 5:
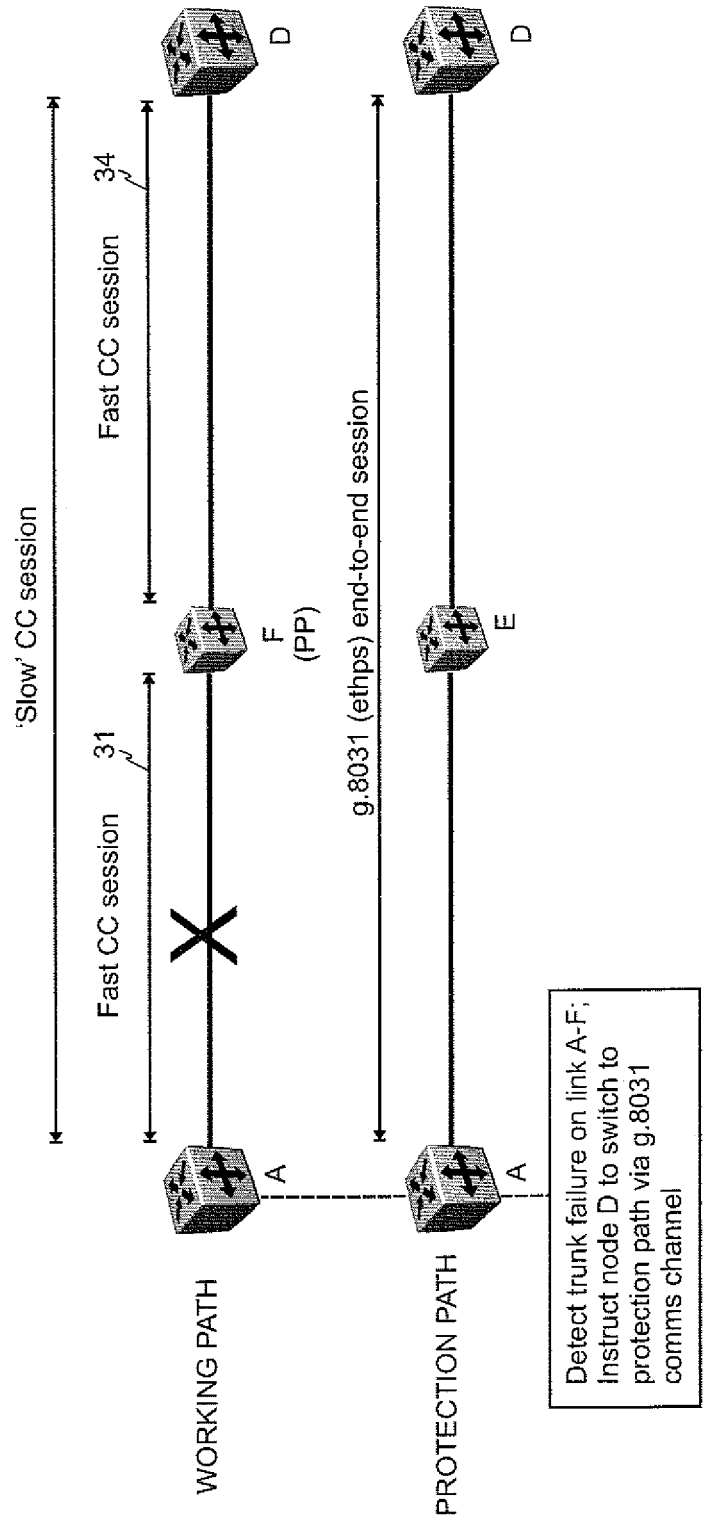
FIG. 5 shows a second way of signalling failure on one of the legs of the network of FIG. 1 which uses additional signalling between endpoints of a trunk.

FIG. 5 illustrates this option. A further form of OAM signalling between trunk endpoints is standardised as g.8031 (formerly known as g.ethps). G.8031 was intended to be equivalent to SONET/SDH Automatic Protection Switching (APS) as described in the T1.105.01, ITU-T G.841 & ITU-T G.7042/Y.1305 industry standards amongst many others and the g.8031 signalling fits within a y.1731/802.1ag message. In g.8031, each endpoint of a trunk transmits that endpoint's current state, where some examples are: Idle; Signal Degrade; Signal Fail as well as: what channel it would like to receive on; the channel the signalling travels along; and which channel it is currently transmitting. There is an arbitration scheme as to which endpoint's request gets priority. This is usually the endpoint with the biggest problem. Where a protection pair of trunks exist between two endpoint nodes, the g.8031 signalling ensures that both endpoint nodes are transmitting on the same trunk. In FIG. 5 each endpoint node A, D of a trunk uses protection synchronisation signalling such as g.8031 described above.

Fast CC monitoring for the path between endpoints A and D is broken into two separate CC sessions 31, 34 which terminate on the intermediate node F. In this embodiment, node F supports one fast CC session to each node that a trunk is routed to. Node F sends fast CC messages at the required intervals. However, node F does nothing as a result of a CC failure (unless it is also an edge node) and it does not raise an alarm.

CC failure is detected by endpoint nodes A or D. In the example of FIG. 5 node A detects CC failure as the failure is between nodes A and F. Node D will be unaware of a problem as the fast CC session 34 indicates the line is OK. Upon detection of a continuity failure, node A will immediately regard all trunks going to node F as having failed, and so the endpoint node A initiates a protection switch. Protection synchronisation signalling (via the g.8031 signalling path) via the protection path between the endpoint nodes A, D ensures that the other endpoint node D also protection switches. A similar process occurs when a fault occurs between nodes F and D. Node A will be unaware of a problem as the fast CC session 31 indicates the line is OK. Upon detection of a continuity failure, node D will immediately regard all trunks going to node F as having failed, and so the endpoint node D initiates a protection switch. Protection synchronisation signalling (via the g.8031 signalling path) via the protection path between the endpoint nodes A, D ensures that the other endpoint node D also protection switches.

This embodiment has an advantage of requiring minimal extra functionality at the intermediate node F. A disadvantage is that the system is limited to one pinning point in any path (although see later for ways of working around this limitation), and the g.8031 signalling is slower than the fast CC session.

Option 3—Signal Failures Per-Node

Figure 6:
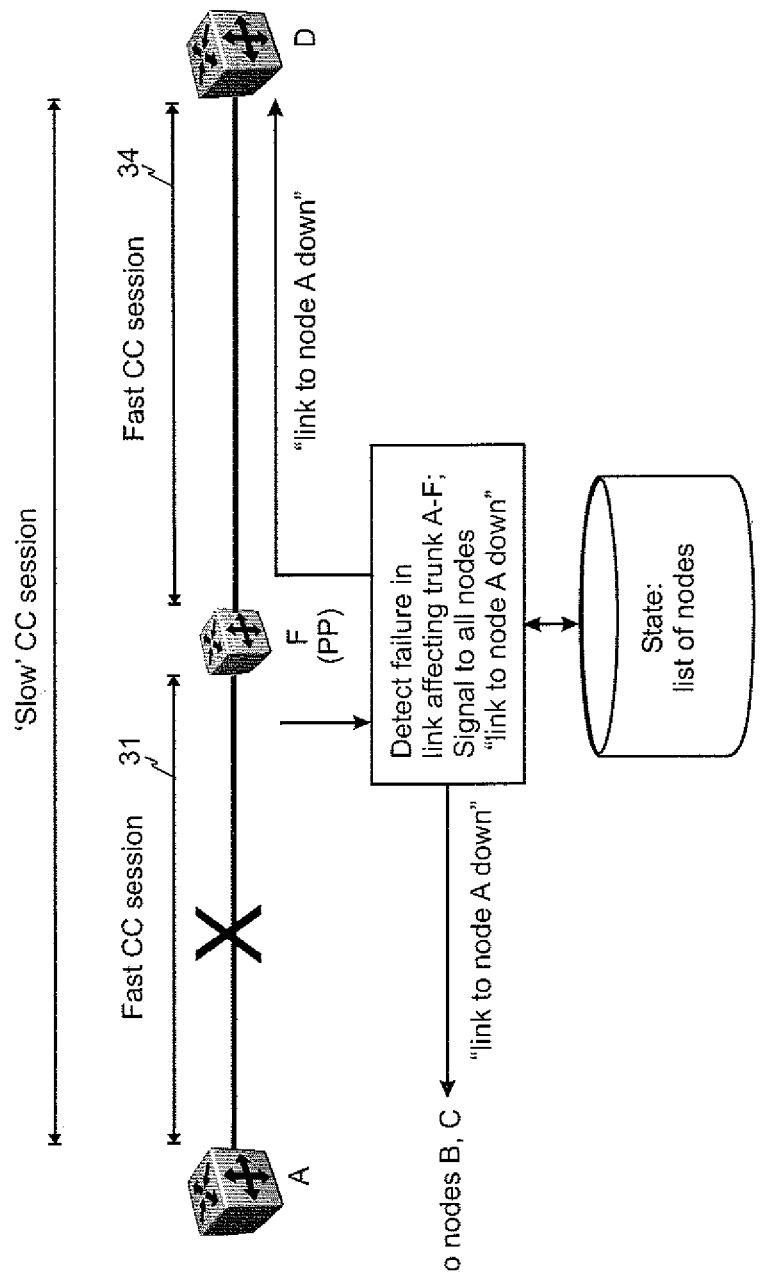
FIG. 6 shows a third way of signalling failure on one of the legs of the network of FIG. 1 which uses a list of nodes served by the intermediate node.

FIG. 6 illustrates this embodiment of the invention. Fast CC monitoring for the path between endpoints A and D is broken into two separate fast CC sessions 31, 34 which terminate on the intermediate node F. Node F monitors for failure of a link by detecting a failure to receive CC messages within a predetermined interval. When node F fails to receive CC messages from node A within the predetermined interval, node F sends a failure notification message of the form "link to node A down" to all other nodes to notify them that node A is out of contact via node F. Similarly, when node F fails to receive CC messages from node D within the predetermined interval, node F sends a failure notification message of the form "link to node D down" to all other nodes to notify them that node D is out of contact via node F. The existing state stored in the forwarding database of node F can be used to determine which nodes need to be contacted. This embodiment has an advantage that no additional state is required, and the scheme will work with any number of intermediate nodes between endpoint nodes. The failure notification message can be sent in the context of the same Connectivity Fault Management (CFM) session as the fast CC messaging, i.e. session 34 or session 31. This can considerably reduce the amount of fault-indication messaging since the only one fault-indication message needs to be sent along the shared OAM session on behalf of a set of trunks sharing that session. A proprietary message may have to be created to carry the failure-notification signalling, and there is a potential disadvantage that signalling upon link failure may be sent to a large number of nodes who are not interested in knowing about the link failure.

One way of implementing this option is for node F's list of proxy fast CC sessions to explicitly contain node IDs to send messaging to. Node F effectively sends messages 'along' all proxy OAM sessions (except the one known to be broken). Further information is required if there is more than one intermediate node. One approach is for the failure notification messages to record the route they travel, e.g. for a path A-B-C-D (where B & C are pinning points), if link AB goes down then C must forward a message saying "link to A via B; C has gone down"—to distinguish it from a different route AD having gone down.

As the number of proxy points increases it is desirable to avoid looping of these failure notification messages. There is a special case with two intermediate points which is particularly important as it reflects an access-core-access network type, with pinning points at both boundaries. This is trivially solved by split-horizon forwarding at the boundaries, i.e. the pinning points will only forward OAM 'node down' notifications access-core or core-access, but not core-core or access-access. [Note: This doesn't preclude a core-core tunnel transmitting but not terminating at a core pinning point X, as it wouldn't be terminating its proxy OAM session at X]. If there are more than two pinning points then a routing algorithm may be needed although it is possible to engineer a network to avoid this scenario, since not all pinning points along a path have to be OAM proxies.

Option 4—Signal Failures Per-Node to Interested Parties Only

Figure 7:
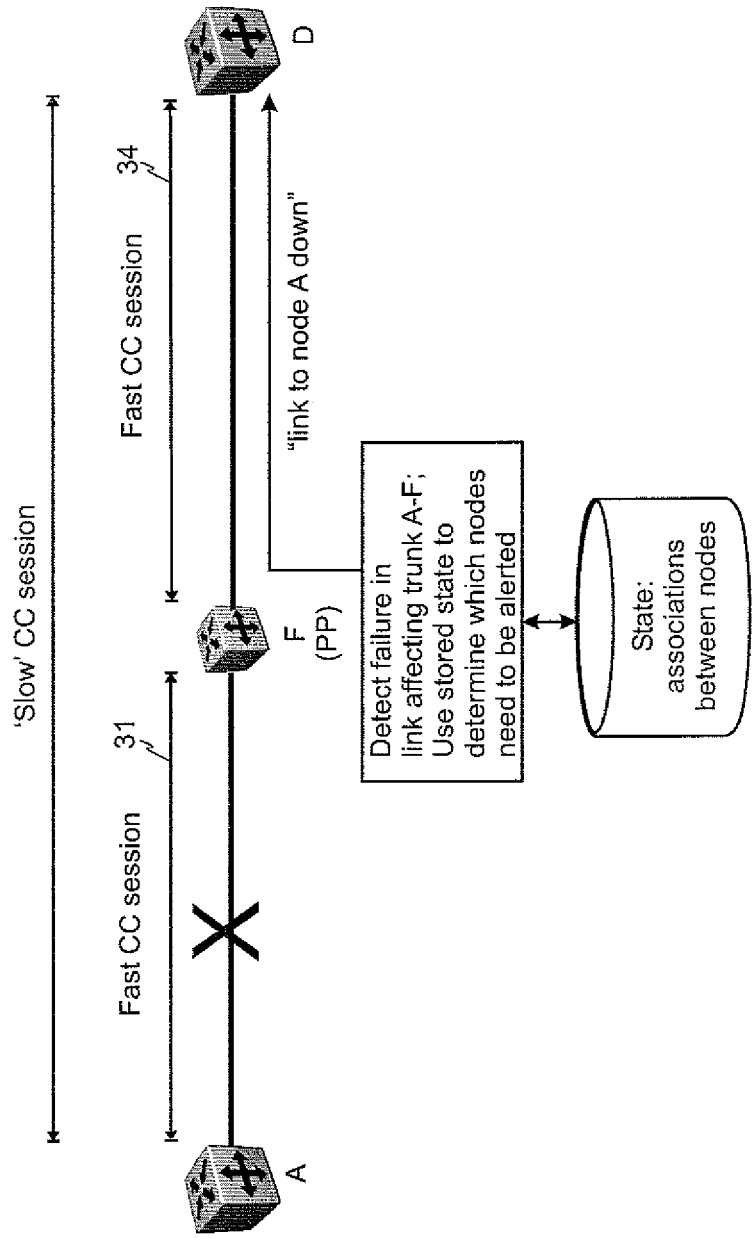
FIG. 7 shows a fourth way of signalling failure on one of the legs of the network of FIG. 1 which uses a list of associations between nodes.

FIG. 7 illustrates this embodiment of the invention. This embodiment is a compromise between options 1 and 3. Fast CC monitoring for the path between endpoints A and D is broken into two separate fast CC sessions 31, 34 which terminate on the intermediate node F. Node F monitors for failure of a link by detecting a failure to receive CC messages within a predetermined interval. When node F fails to receive CC messages from node A within the predetermined interval, node F sends a message of the form "link to node A down" only to nodes which need to be notified of this failure. This has an advantage of reducing unnecessary signalling and processing of unwanted messages at remote nodes. As with Option 3, the failure notification message is sent in the context of the same CFM session as the fast CC messaging.

Node F does not need to maintain full per-trunk state but maintains a list of associations of edge nodes, e.g. node x has at least one trunk to node y. Then, if the CC session to edge node x fails, it knows node y is interested (and will be notified), even if node z isn't (and so won't be notified). This option has different attributes depending on whether the associations are provisioned by provisioning software which has full trunk state, or whether the node has full trunk state and derives the associations from that. The former option, where associations are provisioned by an OSS with full trunk state risks mis-configuration (simply because a node is being provisioned with two distinct pieces of information rather than deriving the information from stored forwarding state) but the use of a slow CC session between endpoints means that correct automatic behaviour will eventually take place. The latter option, where the node has full trunk state and derives the associations from that, arguably only has a slight advantage over Option 1. It requires only one message per edge node, rather than one per trunk to that edge node. This embodiment has an advantage of supporting multi-hop routes between multiple pinning points and has a disadvantage of requiring the pinning point to store some additional state. This option is well suited to networks with large numbers of nodes and relatively few trunks routed through hubs.

FIGS. 1 and 3 show a simple network topology in which there is one intermediate node (pinning point) in the path between endpoints of a trunk. However, the principle can be extended to networks with multiple intermediate nodes (pinning points) in the path between endpoints, as previously described with reference to FIG. 8. Fast CC sessions can be performed between intermediate nodes (pinning points) to reduce the amount of fast CC session processing and to reduce the amount of fast CC session messages. In the example network of FIG. 8, a shared OAM session is performed between nodes M and N on behalf of a first trunk routed H-M-N-K and a second trunk routed J-M-N-L. Traffic does not have to be terminated at node M or N. Instead, nodes M and N are selected as endpoints of the shared OAM session because of their convenient position in the topology of the network.

In Option 2 above it was noted that the technique of relying on g.8031 signalling between endpoints limited the method to paths which have a single intermediate node (pinning point). However, there are several options to work around this apparent limitation.

Firstly, it is possible to selectively bypass intermediate nodes (pinning points). That is, a trunk passes through a node which serves as a pinning point (in terms of routing trunks) but does not serve as a termination point for an OAM session. Consider a network in which a group of trunks are co-routed along a path between nodes A-B-C-D. A shared OAM session could be performed between nodes A-C and another, overlapping, shared OAM session could be performed between nodes B-D.

Figure 9:
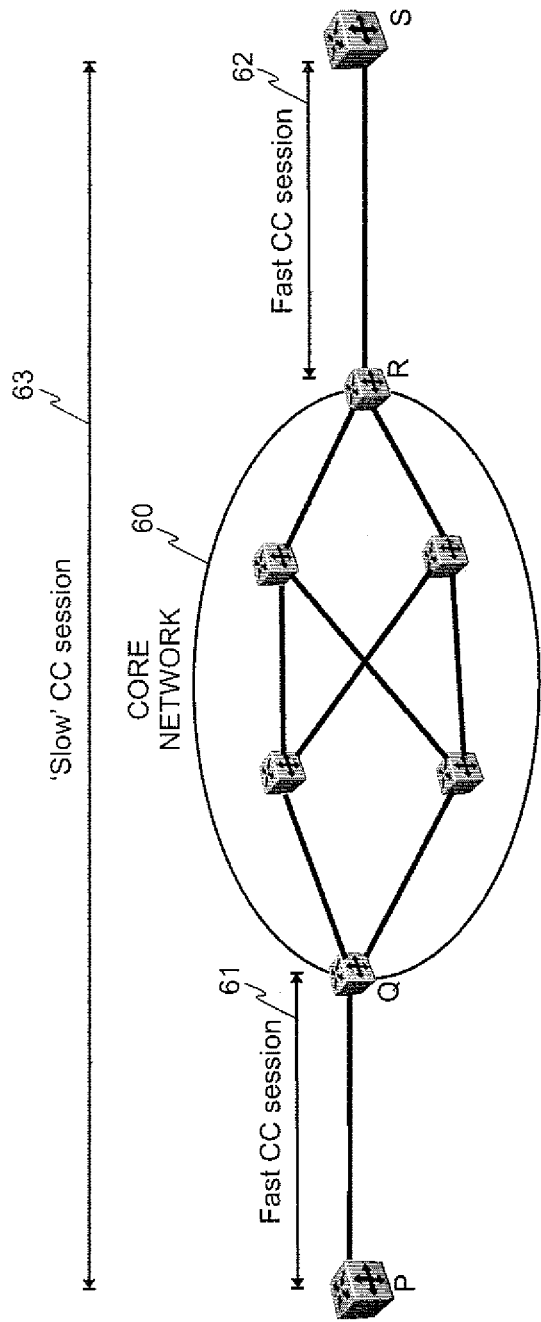
FIG. 9 shows how the method of FIG. 5 can be applied to networks with multiple pinning points.

Secondly, it is possible to simply trust the core network. This is an option where the trunk is routed via a combination of, for example, a collector network, a core network and a collector network. FIG. 9 illustrates this option. A trunk connects node P with node S, via two intermediate nodes Q, R. The first leg P-Q of the trunk and the second leg R-S form part of collector networks where traffic is gathered from outlying equipment. The trunk is routed between Q-R over a core network 60, which is a high-capacity network typically having a meshed or ring topology. Typically the core network will have its own mechanism for detecting faults and rerouting trunks in the event of faults. As an example, a SONET or SDH network has fault detection and protection switching mechanisms. A first fast CC session 61 is performed between nodes P and Q and a second fast CC session 62 is performed between nodes R and S. A Slow CC session 63 is performed between endpoints P, S.

The above description describes point-to-point trunks between endpoints. In PBT, MAC-in-MAC encapsulation and dis-encapsulation occur at each endpoint, as defined in IEEE 802.1ah (Provider Backbone Bridges). At a first endpoint a customer's traffic is encapsulated using IEEE 802.1ah MAC-in-MAC encapsulation, conveyed over a carrier's network, and de-encapsulated at a second endpoint, before delivery to the end customer.

Figure 10:
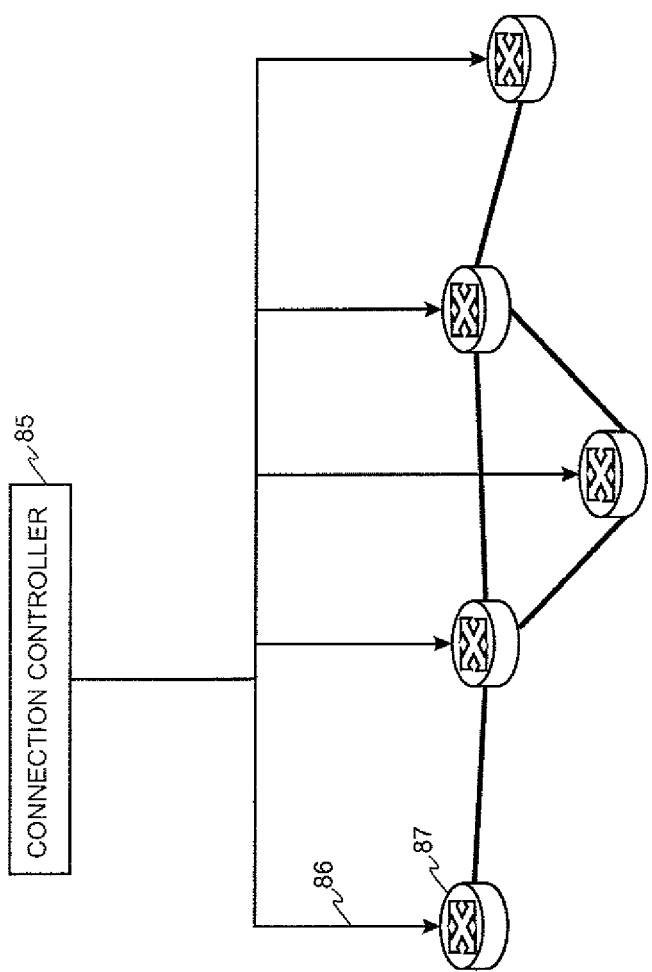
FIG. 10 schematically shows a control plane for the nodes of the network.

FIG. 10 schematically shows a number of switches 87 deployed in a network and a control plane of the network. Each of the switches 87 is located at one of the nodes A-F previously described. A connection controller 85 communicates with each Ethernet switch 87 deployed in the network. Connection controller 85 sends signalling information 86 to each switch 87 which instructs the switch to store forwarding instructions to implement a trunk routing. The instructions will take the form, for example of: forward frames with a destination MAC_address1 and VID1 arriving at port X of the switch to port Y of the switch, and forward return-path frames with destination MAC_address2 and VID2 arriving at port Y to port X. The instructions are specific to each switch 87. Although a single connection controller (CC) is shown here, there can be a set of such controllers which are distributed throughout the network. The connection controller 85, or another network management entity, configures the proxy OAM sessions previously described by sending instructions to nodes (e.g. node F in FIGS. 3-7) and sending state for storing at a node, which configures the node to issue fault-indication signalling.

Figure 11:
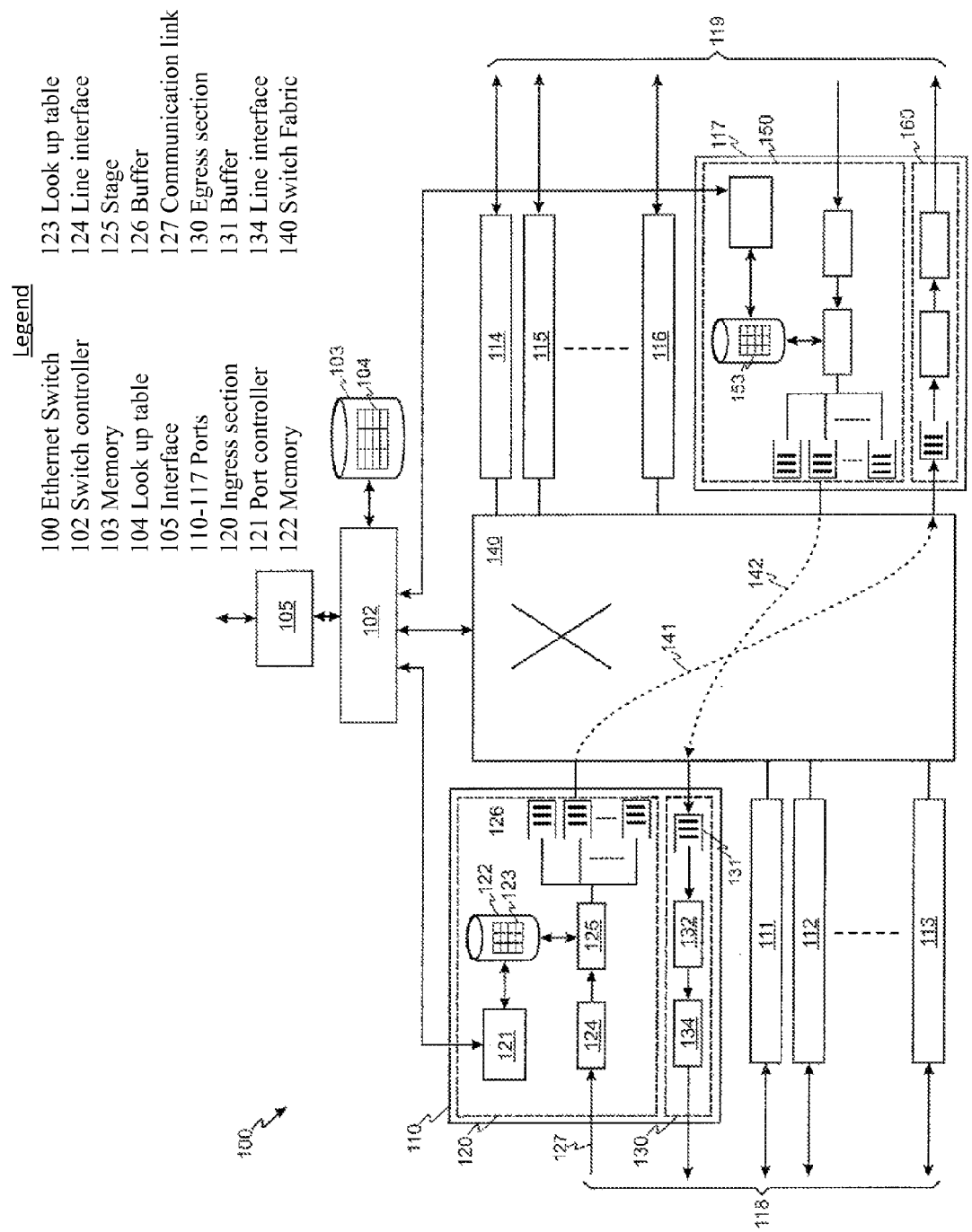
FIG. 11 shows apparatus at one of the nodes.

FIG. 11 shows an example of equipment at each managed Ethernet switch 100. The switch 100 has a set of ports 110-117 which are interconnected by a switch fabric 140. One such port 110 is shown in detail and each port has the same structure. Ethernet ports are bi-directional and comprise an ingress section 120 and an egress section 130 which share a common MAC address. The ingress section 120 has a line interface 124 which connects to a communication link 127. The line interface converts the incoming signal from a format used on the line 127 to a baseband electrical digital signal which can be used by the following stages. Typically, this involves receiving, and demodulating, an optical signal and decoding the demodulated signal from a line code used for transmission. For each frame, stage 125 determines a destination port of the switch that the frame should be sent to by examining fields within the frame and a priority for that frame. In the preferred scheme just described, this requires stage 125 to inspect the destination address field and the VLAN tag field of the frame. A look-up table 104 is stored in a memory 103 which is shared by all ports of the switch, or each port (or a subset of the ports) can have a dedicated look-up table 123 stored in a memory 122. Stage 125 performs a look-up operation using the destination address and VLAN tag to identify the port that the frame should be sent to. Stage 125 sends the frame to the appropriate buffer 126 where the frame is queued before the switch fabric transfers the frame to the required destination port. Typically, a switch will transfer fixed sized blocks of data across the switch fabric (e.g. cells 80 bytes in length) to maximise efficiency of the switch and to minimise blocking between switch ports, but this is not important to the invention and the switch can use any technology for the switch fabric. At the egress section of the destination port the blocks are reassembled in a buffer 131 before being sent to a line interface 134. Typically, this will involve encoding the data frame with a line code and modulating the electrical digital signal onto an optical carrier.

Each port is associated with a port controller 121 which is responsible for maintaining the forwarding table 123 at that port. Port controller 121 communicates with a switch controller 102. Port controller 121 is essentially a 'housekeeping' processor which performs tasks locally at the port, in response to instructions received from switch controller 102. Switch controller 102 maintains a master forwarding table 104 in storage 103 local to the controller 102 and communicates via a signalling interface 105 to a connection controller. As connections across the network are set-up, changed (e.g. due to traffic management operations) or torn down, switch controller 102 receives instructions to add or remove entries in the forwarding table 104 from a network connection controller. The information received at switch controller 102 from a Network Management System will typically refer to a physical address and will set up a bi-directional path (i.e. forward and return paths) at the same time {i.e. forward frames with destination MAC_address1 and VLAN1 arriving at port X to port Y; forward return-path frames with destination MAC_address2 and VLAN2 arriving at port Y to port X}. Updated forwarding information is distributed by switch controller 102 to individual port controllers. In an alternative, simplified, switch the local forwarding table 123 at each port is omitted and only a single forwarding table 104 is used. The switch 100 performs features of the present invention which have been described in detail above. For a switch 100 which is acting as a proxy node (node F in FIGS. 3-7), switch controller 102 is instructed, via interface 105, to establish OAM sessions with other network nodes and the switch controller 102 receives state for use by that switch 100 which is stored in store 103. Fault detection, can be performed by the controller 102 and, when a fault is detected, a fault-indication message (e.g. AIS) is sent from the controller to an appropriate port for transmission to an endpoint node.

The invention is not limited to the embodiments described herein, which may be modified or varied without departing from the scope of the invention.

We claim:

1. A method of performing end-to-end Operation Administration and Maintenance (OAM) sessions on connections in a packet-based network, in which a first of the connections is routed on a first path between a first pair of endpoint nodes of the network and a second of the connections is routed on a second path between a second pair of endpoint nodes of the network, the first and second paths having a shared path portion, the method comprising:
  establishing a first OAM session between the first pair of endpoint nodes;
  establishing a second OAM session between the second pair of endpoint nodes;
  establishing a third OAM session as a shared OAM session between an intermediate node on the shared path portion and another node on the shared path portion; and
  providing, by the intermediate node, fault notification information from the shared OAM session to the first and second OAM sessions when the shared OAM session indicates that a fault has occurred,
  wherein:
  the first OAM session exchanges messages between the endpoints of the first connection at a first rate;
  the second OAM session exchanges messages between the endpoints of the second connection at a second rate; and
  the shared OAM session exchanges messages between the intermediate node and the other node at a third rate which is faster than the first and second rates.

2. The method of claim 1, comprising:
storing state at the intermediate node;
monitoring for a fault condition in the shared OAM session; and
using the stored state to provide the fault notification information from the intermediate node to the first and second OAM sessions when the fault condition occurs.

3. The method of claim 2, wherein state is configured per-connection and providing fault notification information comprises providing fault indication information on a per-connection basis according to which connection is affected by the fault condition.

4. The method of claim 3, wherein the fault indication information is an Alarm Indication Signal (AIS).

5. The method of claim 2, wherein the state stored at the intermediate node comprises information identifying at least one leg of a connection passing through the intermediate node and information associating the shared OAM session with the connection.

6. The method of claim 5, wherein the intermediate node is arranged to forward traffic between ports of the intermediate node according to stored forwarding information which comprises a combination of a destination address and another identifier.

7. The method of claim 6, wherein the forwarding information specifies a destination MAC address and a VLAN identifier carried within an outer header of a data frame.

8. The method of claim 2, wherein the stored state comprises a list of nodes to be notified if the fault condition occurs.

9. The method of claim 8, wherein the stored state comprises a list of nodes that are endpoints of connections that share the shared path portion, the method comprising sending fault notification information only to nodes affected by the fault condition.

10. The method of claim 1, wherein endpoint nodes of the first connection are connected via a working path and a protection path, the working path comprising the first connection, the method comprising:
monitoring, at the endpoint nodes of the first connection, for a fault condition using the shared OAM session;
exchanging protection switching signaling between the endpoint nodes of the connection using the protection path; and,
causing traffic to be switched to the protection path when a fault condition occurs on the first connection.

11. The method of claim 1, wherein the shared OAM session comprises a continuity check and the method comprises detecting when a continuity check fault Occurs.

12. The method of claim 1, wherein the first connection and the second connection are Provider Backbone Transport (PBT)/Provider Backbone Bridging-Traffic Engineering (PBB-TE) trunks.

13. The method of claim 1, wherein:
the first OAM session is bi-directional;
the second OAM session is bi-directional; and
the shared OAM session is bi-directional along at least part of the shared path portion.

14. A method of configuring an Operation Administration and Maintenance (OAM) session in a packet-based network, the method comprising:
configuring a first pair of endpoint nodes to establish a first bi-directional end-to-end OAM session on a first connection through the network, the first connection extending over a first path through the network;
configuring a second pair of endpoint nodes to establish a second bi-directional end-to-end OAM session on a second connection through the network, the second connection extending over a second path through the network, the second path through the network and the first path through the network having a shared portion where the first and second paths share a common route through the network;
configuring a third pair of endpoint nodes, to implement the first bi-directional end-to-end OAM session and the second bi-directional end-to-end OAM session on at least part of the shared portion as a third bi-directional OAM session along the at least part of the shared portion; and
configuring the third pair of endpoint nodes to provide fault notification information to the first and second pairs of endpoint nodes when the third bi-directional OAM session indicates that a fault has occurred on the at least part of the shared portion,
wherein:
the first bi-directional OAM session exchanges messages between the endpoints of the first connection at a first rate;
the second bi-directional OAM session exchanges messages between the endpoints of the second connection at a second rate; and
the third bi-directional OAM session exchanges messages between the third pair of endpoint nodes at a third rate which is faster than the first and second rates.

15. The method of claim 14, wherein the fault notification information is an Alarm Indication Signal (AIS).

16. The method of claim 14, wherein the third bi-directional OAM session comprises a continuity check and the method comprises detecting when a continuity check fault occurs.

17. The method of claim 14, wherein the first rate is equal to the second rate.

18. The method of claim 14, wherein the first connection and the second connection are Provider Backbone Transport (PBT)/Provider Backbone Bridging-Traffic Engineering (PBB-TE) trunks.

* * * * *